United States Patent [19]
Gisby

[11] Patent Number: 5,943,416
[45] Date of Patent: Aug. 24, 1999

[54] AUTOMATED SURVEY CONTROL ROUTINE IN A CALL CENTER ENVIRONMENT

[75] Inventor: Doug Gisby, San Francisco, Calif.

[73] Assignee: Genesys Telecommunications Laboratories, Inc., San Francisco, Calif.

[21] Appl. No.: 09/024,827

[22] Filed: Feb. 17, 1998

[51] Int. Cl.⁶ .................................................. H04M 11/00
[52] U.S. Cl. ...................... 379/265; 379/92.03; 379/197; 379/210
[58] Field of Search ............................... 379/92.01, 92.02, 379/92.03, 92.04, 93.01, 93.12, 93.13, 93.34, 88.23, 88.24, 88.25, 196, 197, 265, 266, 267, 210

[56] References Cited

U.S. PATENT DOCUMENTS

| | | | |
|---|---|---|---|
| 4,811,382 | 3/1989 | Sleevi | 379/202 |
| 4,943,995 | 7/1990 | Daudelin et al. | 379/77 |
| 5,838,774 | 11/1998 | Weisser, Jr. | 379/92.01 |

*Primary Examiner*—Fan S. Tsang
*Attorney, Agent, or Firm*—Donald R. Boys

[57] ABSTRACT

A call center is adapted to select calls on a preprogrammed basis for possible participation in a survey. Selected calls are transferred to an interrogation point, which may be by Interactive Voice Response, where the callers are asked if they will participate. For those callers who do not wish to participate, the calls are routed by normal routing rules. For those callers who do wish to participate, the calls are transferred according to survey routing rules, and after transaction with an agent, to a survey point where the survey is conducted. In one embodiment callers who indicate a willingness to participate, but hang up before being transferred to a survey point, are automatically called back, and then, if willing, transferred to the survey point.

11 Claims, 2 Drawing Sheets

AUTOMATED SURVEY CONTROL ROUTINE IN A CALL CENTER ENVIRONMENT

FIELD OF THE INVENTION

The present invention is in the field of computer-telephony-integration (CTI) including Internet Protocol Network Telephony (IPNT) and has particular application to methods for initiating and completing customer call surveys.

BACKGROUND OF THE INVENTION

Telephones are one of the most widely used communication tool in the world. At early stages in development, telephones were merely a convenient tool to allow people to communicate while they are physically separated. At the present time, however, many organizations use telephones to market products and services, provide technical support to customers, allow customers to access their own financial data, and much, much more. Thus, telephone systems have become a widely used major business and marketing tool.

In order to effectively use telephone systems for business and marketing purposes, telephony call centers have been developed. In a call center, typically a relatively large number of agents handle telephone communication with clients. A typical call center has at least a telephone switching apparatus, such as a PBX, which has a trunk for incoming calls an station-side ports for connecting to agent's telephones. The switching apparatus may be an Automatic Call Distributor (ACD), distributing calls to agents as they become available, or the switching apparatus may be controlled by a connected processor in what is known in the art as a Computer Telephony Integration (CTI) system. The matching of calls between clients and agents is typically performed by software.

A simple example is used here to describe a few of the many advantages of call centers. When a call is made to a call center, the telephone number of the calling line is typically made available to the call center by a telephone carrier. Based on this data, software in the call center can access a database server to obtain information about the client placing the call. The software can now route the call to an agent who can best handle the call based on predefined criteria (e.g., language skill, knowledge of products the customer bought, etc.). Such a system is known as skill-based routing, known to the present inventor. In some cases the software may immediately transfer relevant information about the client to a computer screen used by the agent (screen pop). Thus, the agent can gain valuable information about the client prior to receiving the call. As a result, the agent can more effectively handle the telephone transaction.

In recent years, advances in computer technology, telephony equipment, and infrastructure have provided many opportunities for improving telephone service in publicly switched and private telephone intelligent networks. Similarly, development of separate information and data network known as the Internet, together with advances in computer hardware and software have led to a new multimedia telephone system known in the art as Internet Protocol Network Telephony (IPNT). In IPNT calls are handled directly between computers over a digital network, and voice data is packaged as data packets.

Under ideal circumstances IPNT telephony has all the quality of conventional public and private telephone intelligent networks, and many advantages accruing from the aspect of direct computer-to-computer linking. Circumstances re: the Internet are, however, often less than ideal, and bandwidth limitations typically lead to delay and interruption of voice communications. Video calls using such as the Internet rather than conventional telephony networks with dedicated bandwidth are even less efficient because higher bandwidth is required.

Still, even given these realities, In IPNT as well as in the older intelligent and CTI-enhanced telephony systems, both privately and publicly switched, it is desirable to handle more calls faster and to provide improved service in every way.

One of the major goals in operation of a call center, either CTI or IPNT-enhanced, is to insure customer satisfaction. One of the methods commonly employed in this regard involves taking customer surveys. In a customer survey, questions are presented to the caller relating to customer satisfaction and agent performance. In this way, a call center administrator may evaluate agent performance. Adjustments may then be made depending on the results of several surveys involving particular agents. For example, if more than one caller has experienced a problem with a particular agent, that problem can be isolated and appropriate actions such as additional training and the like may be undertaken.

In some cases, surveys are taken in order to improve agent responsibility and professional demeanor. In other instances, surveys may be initiated for the purpose of obtaining additional information about the clients such as likes or dislikes of certain products or services, or perhaps to illicit suggestions from the clients about what types of changes they would like too see in future products, and so forth.

In current art, customer surveys are accomplished by making a call to the client either before ("cold calling") or after the client has had some form of contact with the company, as would be the case of a typical follow-up survey. In other instances, surveys may be mailed to the client to fill out and mail back. Often, a second contact with the client occurs well after the initial company-client contact, as would be the case with mailed surveys.

The results obtained in such surveys can be vague or misleading, partly because of the time factors involved. Furthermore, there is often considerable delay with such call backs. For example, a live agent may already have a large backlog of repeat customers to call. Therefore, delays can be considerable resulting in the customer not being home at the time of the call back, or perhaps, the customer forgetting many important aspects regarding the original contact with the particular company.

What is clearly needed is a method and apparatus whereby a callcenter administrator may select calls at random or by percentage, and initiate a voluntary survey with a customer in an automated fashion and immediately at the end of the agent-customer transaction.

SUMMARY OF THE INVENTION

In a preferred embodiment of the present invention, an automatic survey system for a call center is provided, comprising a selector for selecting callers to be asked to participate in a survey; an interrogator adapted to ask selected callers if they will participate; and a router adapted to route calls from selected callers who do not wish to participate to agents based on non-survey routing, rules, and calls from customers who do wish to participate according to survey routing rules. The router is also adapted to route call after transaction with an agent to a survey point, where a survey with the caller is conducted.

In some embodiments the survey point comprises a live survey agent who conducts a survey with the caller. In some other embodiments the survey point comprises an IVR adapted to conduct a survey with the caller. IN still other embodiments, at the survey point, the survey is partly automated, and partly conducted by a live agent. In some embodiments the system further comprises an automatic dialer for calling back callers who agreed to the survey, but who disconnected after the agent transaction without holding for the survey.

In another aspect of the invention a call center adapted for automated surveys is provided, comprising a telephone switching apparatus having a trunk line for receiving calls from a network and station-side ports connected to telephones at agent stations; a CTI processor connected by a CTI link to the telephone switching apparatus; a first router for routing calls to agents according to first routing rules; and a survey router coupled to the CTI processor. The survey router selects incoming calls according to survey routing rules, causes selected calls to be transferred to an IVR for determination if the caller will participate in a survey, and routes calls from callers who indicate willingness to participate to selected agents for processing, and then to a survey point, and calls from callers who wish to not participate according to the first routing rules.

In some embodiments of the call center, at the survey point, the call is connected to a survey agent who conducts a survey with the caller. IN other embodiments, at the survey point, the caller is connected to an IVR which performs the survey. In still other embodiments the survey may be conducted partly by IVR and partly by a live agent. In some embodiments there may be a dial-back system adapted to dial-up callers who indicated a willingness to participate but disconnected before being transferred to a survey point, and to then transfer willing callers to the survey point.

In yet another aspect a method for practicing the invention is provided, comprising steps of (a) selecting incoming calls for potential participation in a survey according to survey routing rules rather than principal routing rules; (b) transferring the selected incoming calls to an interrogation point; (c) querying the caller at the interrogation point if the caller will participate in the survey; (d) routing those calls for which the caller does not wish to participate by the principal routing rules, to agents to conduct the business of the call; and (e) routing those calls for which the caller indicates a willingness to participate in the survey to selected agents for conducting the business of the call, and then to a survey point. In step (a) incoming calls may be selected partly on a percentage basis. In step (c) querying the caller may be conducted automatically by IVR. There may also be an additional step (f) for calling back callers who indicated a willingness to participate in a survey, but disconnected before being transferred to a survey point.

The invention as taught in enabling detail in description below provides an efficient and flexible way for host organizations having call centers to test the efficiency and competency of agents, and to improve service to callers.

BRIEF DESCRIPTION OF THE DRAWING FIGURES

DESCRIPTION OF THE PREFERRED EMBODIMENTS

Figure 1:
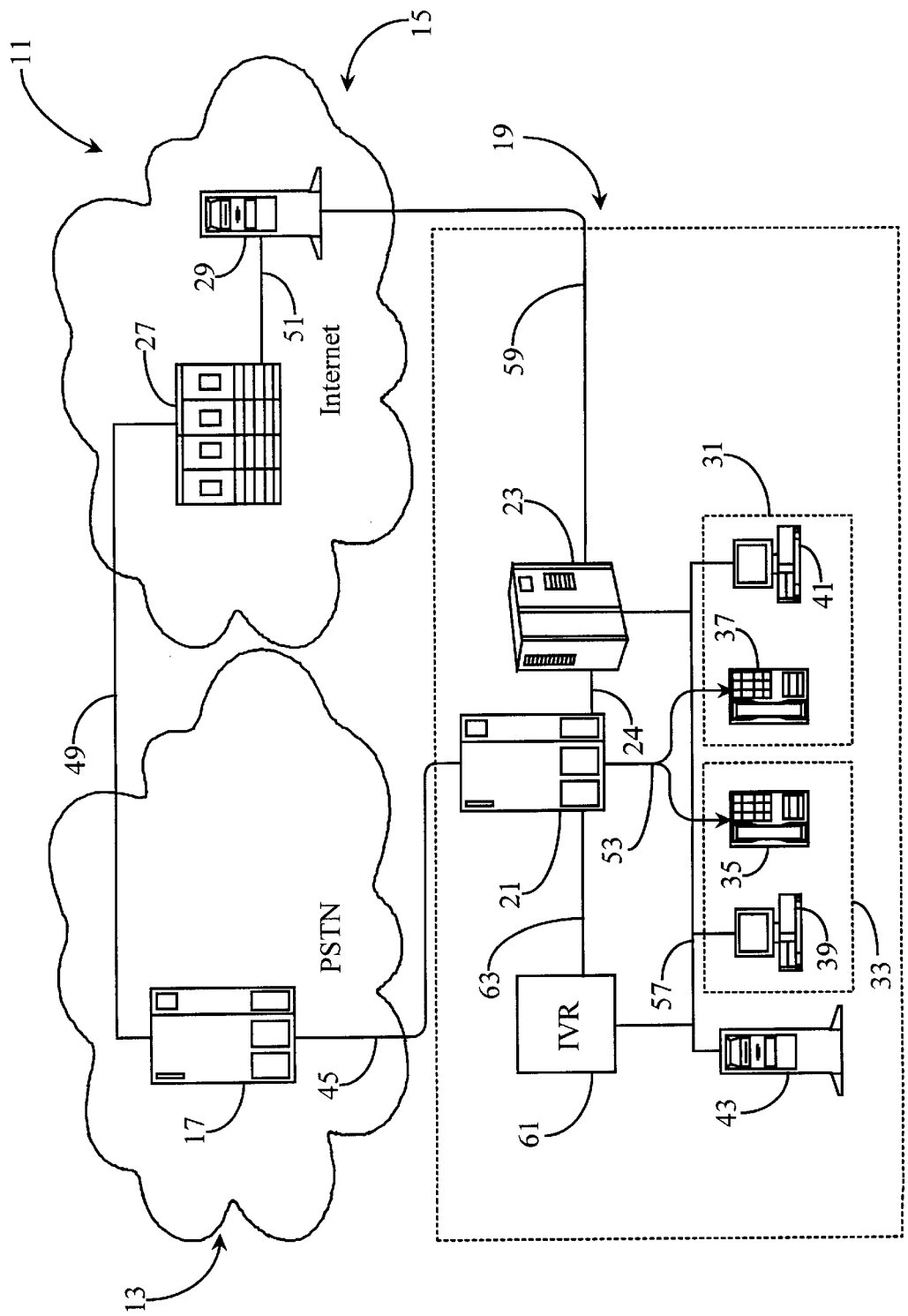
FIG. 1 is an overview of a combined CTI and IPNT call center enhanced with automated survey capabilities according to an embodiment of the present invention.

FIG. 1 is an overview of a combined CTI and IPNT call center enhanced with automated survey capabilities according to an embodiment of the present invention wherein a call-center administrator may select incoming calls via automated routine for the purpose of initiating and completing a customer survey.

Integrated telephony-communications network 11 comprises a call center 19 that is linked to both the Internet represented by cloud 15 and a publicly switched telephone network (PSTN) represented by cloud 13. Telephony communication systems with Internet connectivity such as system 11 are becoming more prevalent in the art and are capable of both conventional telephony analog and Internet-based communication. By conventional telephony is meant all of the telephone system infrastructure that is not IPNT.

A single switching apparatus 17 is shown in PSTN network 13 to represent all of the apparatus and connecting trunks and such that may be extant in the network. Switch 17 is shown connected via trunk 45 to a telephony switch 21 within call center 19. PSTN 13 may be a private network rather than a public network and Internet 15 may be of the form of another wide area network (WAN) such as are known in the art.

The embodiment illustrated herein represents just one example of a telephony communications environment that can utilize the method and apparatus of the present invention. Further, the method and apparatus of the present invention can be implemented in a telephony communications system that is not linked to a WAN. In a preferred embodiment, the present invention is utilized with voice calls arriving at a call center such as call center 19 within the scope of a CTI telephony architecture. However, application of the present invention may also be made to an IPNT system, as briefly noted in the background section and represented here. In this embodiment, call center 19 may handle calls from the conventional telephone network as well as IPNT calls.

Referring now back to FIG. 1, calls originating from PSTN 13 are, in this embodiment, routed to switch 21 in the call center premises. In this embodiment a computer processor 23 is linked to switch 21 via a CTI link 24. CTI processor 23 provides computer enhancement to call center 19. Routing protocol and similar control routines such as statistical and skill based routines are stored and executed via processor 23, which may access other sources of information and data.

CTI processor 23 is connected to a local area network (LAN) 57, which also interconnects PCs agent stations within call center 19 such as an agent station 31 and an agent station 33. Agent station 31 comprises an agent's telephone 37 and an agent's PC 41. Agent station 33 comprises an agent's phone 35 and an agent's PC 39. Also connected to LAN 57, there is a customer information system (CIS) data server 43 and an interactive voice response (IVR) unit 61. IVR 61 is connected to telephony switch 21 via link 63. CIS data server 43 may contain information regarding customers such as history, preferences, order information, and the like. IVR unit 61 includes software and typically digitally recorded messages needed to interact with callers who may be routed to the IVR instead of to live agent.

IVR 61 is multi-taskable meaning that it can interact with callers according to a number of differing criteria. For example, information may be obtained by callers via interactive exchange as well as information being made available to the call center via the same method. Interactive exchange between an IVR such as IVR 61 and a client typically involves voice recognition technology. However, other methods known in the art such as touch tone response may also be employed.

Processor 23 in this embodiment is shown linked to Internet server 29 via a TCP/IP connection 59. In other embodiments the Internet access may be through another server on the LAN accessible to processor 23. Internet server 29 is accessible to agents from PCs on LAN 57 through processor 23 and digital connection 59. Switch 17 in PSTN 13 is shown connected to an Internet Service Provider (ISP) 27 via line 49. The Internet connectivity, as illustrated within this embodiment, is meant to show only that Internet-based communication as well as conventional telephony communication is provided for call center 19, and that aspects of the present invention may be applied to both mediums. WAN access such as access to Internet 15 may be of the form of a dial-up connection or a connection that remains open so that agent's PC's such as agent's PC 41 and agent's PC 39 are continually connected to Internet 15 while they are logged-in to telephony-communications network 11.

In an embodiment of the present invention a software routine enables a call-center administrator, manager or other responsible party to select incoming calls at telephony switch 21 within call center 19, based upon a percentage or random method, for the purpose of initiating a "post call" survey with the selected client-callers. For example, selected calls, prior to being routed to an agent for normal business, are routed to either IVR 61 or a live agent such as an agent at agent station 33. In either case, permission is first elicited from the client-caller to participate in the survey. If a selected caller agrees to participate in the survey, he/she is requested not to discuss the fact of the survey with any agent to whom the call may be routed, and to hold, rather than hang up, after the transaction with the agent is complete so that the caller may be transferred back to IVR 61, or in some embodiments, to a survey agent responsible for conducting the survey. In the case of a live agent conducting the survey, any eligible trained agent or agent supervisor who is not a subject of the survey himself may be used, at any agent station. It will be apparent to those with skill in the art that there will typically be many more agent stations than the two stations 31 and 33 shown in FIG. 1. In this embodiment there are only two agent stations shown, agent station 33 and agent station 31.

The software according to an embodiment of the present invention may execute on processor 23 or another processor linked to LAN 57 and linked to telephony switch 21. In various embodiments, call selection and survey participation may be either partly or wholly automated. For example, in a completely automated instance, a particular group of agents within call center 19 may be designated to be subjects of the survey. Either part of or all of the incoming calls routed to that particular group of agents could be automatically selected and routed to an IVR such as IVR 61. IVR 61, in this case, automatically solicits customer permission to conduct the survey. Willing customers are automatically transferred (after their session with a target agent) to the same or another IVR to participate in the survey. After the interactive survey is performed, the call is terminated and the information cached for later review. In a partially automated instance, call selection and the solicitation of customer permission could be automated while the survey may be conducted by a live agent or agents.

It will be apparent to one with skill in the art that there may be more than one IVR such as IVR 61 connected to LAN 57 without departing from the spirit and scope of the present invention. For example IVR 61 may be used for asking permission from a caller to conduct a survey, and another IVR may be used to actually conduct the survey, and so on. It will also be apparent to one with skill in the art that there may be more than two agent stations such as agent stations 33 and 31 without departing from the spirit and scope of the present invention. In actual practice, many agents could be the subject of surveys during any given time period while many other agents may be conducting surveys, and so on.

In an embodiment wherein IPNT calls are accepted from Internet cloud 15, incoming calls would also be selected from a general queue or routing point. Such a routing point or "virtual destination" could be implemented in processor 23, or in a LAN accessible and Internet-connected file server such as file server 29. In this embodiment it is assumed that IPNT calls are received at a routing point and intelligently routed to agents best suited to handle the calls, just as is accomplished for plain old telephony service (POTS) calls.

In this case an IVR is implemented to operate in Internet Protocol. Selected calls are routed to the IPNT IVR for the solicitation of permission for participation, just is the previously described case. In some instances the IVR for both POTS calls and IPNT calls could be the same IVR (61). From IVR 61 willing IP calls are routed to the PCs of target agents while non-willing IP callers are routed to regular agents who are not the subject of the survey. After agent contact has transpired, willing IP callers are either re-queued in IVR 61 to participate in the survey or routed to a survey agent's PC to participate in the survey.

In some embodiments, an IVR such as IVR 61 may, as described above, handle IP and POTS calls at the same time, and may also accept overload calls originally destined for live survey agents. Furthermore, live survey agents may be put to work accepting overload calls originally destined for the IVR survey. The method and apparatus of the present invention may be integrated with any number of routing rules.

Figure 2:
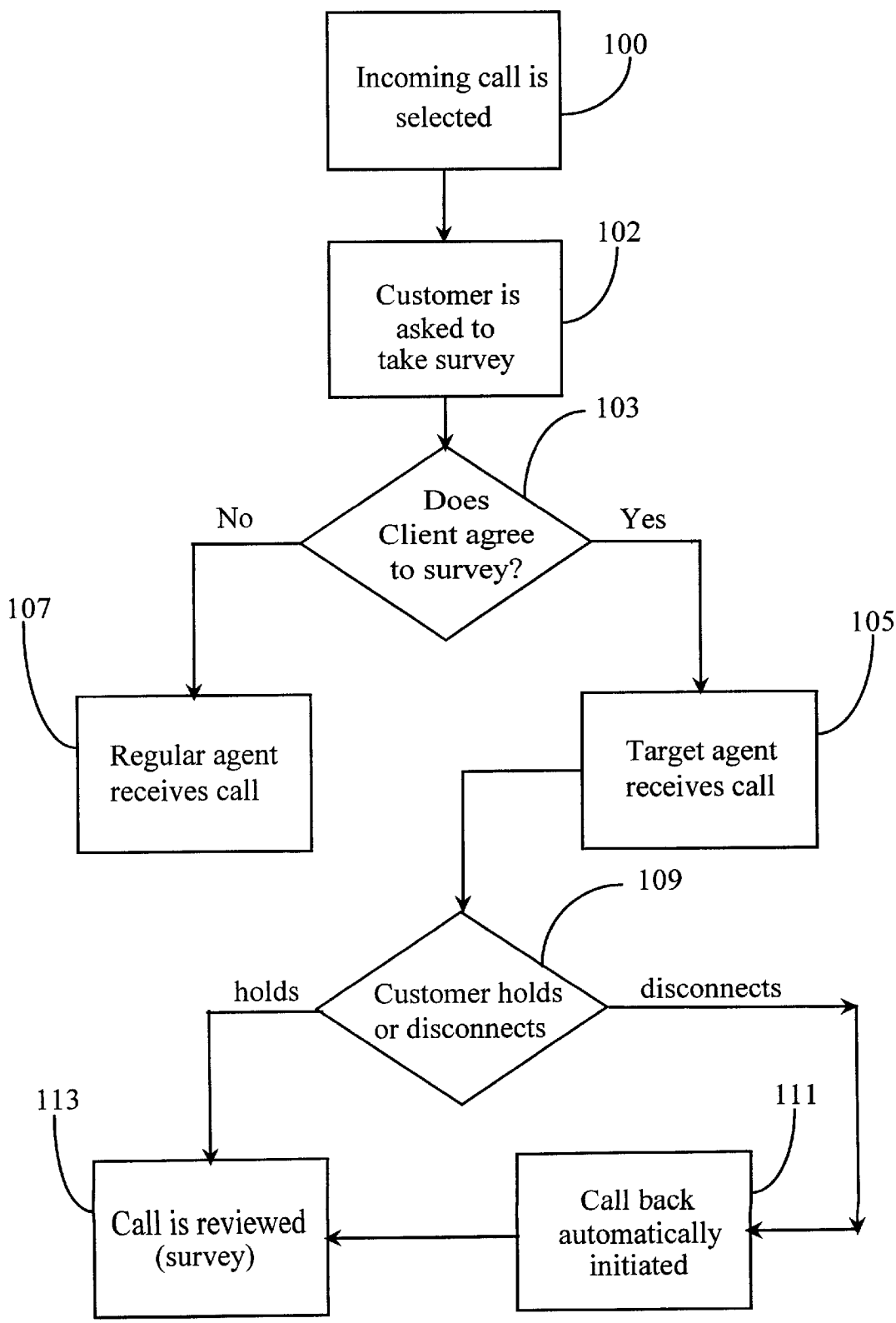
FIG. 2 is a workflow chart illustrating various steps of a survey routine according to an embodiment of the present invention.

FIG. 2 is a workflow chart illustrating steps of a survey routine according to an embodiment of the present invention wherein incoming calls are selected on a percentage basis. In various embodiments of the invention the selection criteria may be altered. For example, in an embodiment as depicted here, wherein calls are selected by percentage, the percentage may be set by an administrator, such as 1%, 5% and so on. IN other embodiments, selection criteria might be to ask clients from certain geographical regions to participate. For example, 10% of all callers from Georgia may be selected for a survey for a certain period of time, then 10% of all callers from West Virginia for another period of time. The skilled artisan will appreciate that the selection criteria may be altered very widely.

In step 100 an incoming call is selected from a queue or virtual destination point, according to established selection criteria. In addition to a percentage, as indicated above, other information may be available for a caller. For example, in many instances preprocessing of calls is done in the network in a Service Control Point (SCP), and in that process a caller may be asked to provide certain information. Additionally, elicited information or available with a call, or a DNIS number (for example) as a key, may be used to retrieve more information on a caller from such as database 43 (FIG. 1).

At step 102 a selected caller is asked to take part in a survey. Calls in the survey system are further routed based on this response. For example, if a caller indicates that he/she is not willing to do the survey, then the call is routed to a regular agent. In step 107 a regular agent that is not part of the survey agent population receives the call and disposes of it according to normal procedure. If however, the caller has indicated in step 102 that he/she is willing to take part in the survey, then the call is routed in step 103 to a target agent. A caller agreeing to take the survey is informed in step 103 (or alternatively in step 102) not to discuss the fact with a target agent, and the caller is asked to hold after the transaction with the agent. In step 105, an available target agent receives the call.

As previously described with regards to FIG. 1, the survey routine may be wholly or partially automated. For example, step 102 may be performed via an IVR or other automated interactive means such as an interactive web page (in the case of an IPNT call), or by a live operator or agent. Automation will almost always be the case regarding step 100 because of the volume of incoming calls that is typical in a large call center. However, in some embodiments, even step 100 may be performed by a live agent.

After a transaction with a target agent has occurred, the caller/participant will either hold as previously instructed, or may inadvertently terminate the call in step 109. If a caller holds as instructed, he/she is transferred in step 109 to either an IVR, a live agent, or an agent supervisor to partake in the survey. In step 113, the survey is conducted and the call is then terminated. If however, the caller has inadvertently terminated the call because of memory lapse or another interruption, an automated out-dialer may place a call and attempt to reconnect with the caller in step 111. If reconnection is established, the call is transferred to an IVR or live agent as previously mentioned in step 113.

A certain number of callers who indicated a willingness to participate in the survey in step 102 may, for whatever reason, during the process, decide that they are no longer interested in taking the survey. For this reason, an automated reconfirmation may be initiated at step 111 in the form of automated voice allowing the customer to decline the survey or choose to accept one through the mail, and so on. The out-dialer may be programmed to make an appropriate number of re-tries to the "lost" caller before reporting a failed attempt to re-connect.

It will be apparent to one with skill in the art that the method and apparatus of the present invention may be utilized both with POTS calls and IPNT calls without departing from the spirit and scope of the present invention. For example, a call center equipped with CTI enhancement, wherein agents are connected via a LAN that is also connected through a server to a WAN such as the Internet, and having the appropriate switching, IVR, file server, and software capabilities may handle both analog and IP calls. It may be, as well that a call center may be devoted entirely to IPNT calls, in which case the call center will have agent stations with PCs connected on a LAN to a managing computer, but may not have conventional telephones or telephone switching apparatus such as switch 21 of FIG. 1.

It will also be apparent to one with skill in the art that the method and apparatus of the present invention may be integrated with known routing logic being used in a given call center such as skill-based logic and the like. There are many possible applications to which the method and apparatus of the present invention may be applied without departing from the spirit and scope of the present invention.

By applying the present invention with full automation, a large number of general surveys may be conducted simultaneously, generating much valuable information. By utilizing human control, more intimate surveys may be conducted, perhaps regarding only a few individuals. Criteria for call selecting may be widely varied according to virtually any logical routing criteria that may be in place. Levels of automation may also vary widely. The spirit and scope of the present invention is limited only by the claims that follow.

What is claimed is:

1. An automatic survey system for a call center, comprising:
    a selector for selecting callers to be asked to participate in a survey;
    an interrogator adapted to ask selected callers if they will participate; and
    a router routing calls from selected callers who do not wish to participate to agents based on non-survey routing rules, and calls from customers who do wish to participate according to survey routing rules; and
    an automatic dialer for calling back callers who agreed to the survey;
    wherein the router is also routes a call after a transaction with an agent to a survey point, and the automatic dialer calls back callers who agreed to the survey, but who disconnected after the agent transaction without holding for the survey.

2. The system of claim 1 wherein the survey point comprises a live survey agent who conducts a survey with a caller.

3. The system of claim 1 wherein the survey point comprises an Interactive Voice Response System (IVR) adapted to conduct a survey with a caller.

4. The system of claim 1 wherein, at the survey point, the survey is partly automated, and partly conducted by a live agent.

5. A call center adapted for automated surveys, comprising:
    a telephone switching apparatus having a trunk line for receiving calls from a network and station-side ports connected to telephones at agent stations;
    a Computer-Telephony-Integration (CTI) processor connected by a CTI link to the telephone switching apparatus;
    a first router for routing calls to agents according to first routing rules;
    a survey router coupled to the CTI processor; and
    a dial-back system adapted to dial-up callers who indicated a willingness to participate but disconnected before being transferred to a survey point;
    wherein the survey router selects incoming calls according to survey routing rules, causes selected calls to be transferred to an Interactive Voice Response System (IVR) for determination if a caller will participate in a survey, and routes calls from callers who indicate willingness to participate to selected agents for processing, and then to a survey point, and calls from callers who wish to not participate according to the first routing rules, and the dial back system dials back callers who indicated a willingness to participate but disconnected before being transferred to a survey point.

6. The call center of claim 5 wherein, at the survey point, the call is connected to a survey agent who conducts a survey with the caller.

7. The call center of claim 5 wherein, at the survey point, the caller is connected to an IVR which performs the survey.

8. The call center claim 5 wherein, at the survey point, the survey is conducted partly by IVR and partly by a live agent.

9. A method for conducting a survey in a call center, comprising steps of:
    (a) selecting incoming calls for potential participation in a survey according to survey routing rules rather than principal routing rules;
    (b) transferring the selected incoming calls to an interrogation point;

(c) querying, a caller of a call at the interrogation point if the caller will participate in the survey;

(d) routing those calls for which the callers do not wish to participate by the principal routing rules, to agents to conduct the business;

(e) routing those calls for which the callers indicate a willingness to participate in the survey to selected agents for conducting the business, and then to a survey point; and (f) calling back callers who indicated a willingness to participate in a survey, but disconnected before being transferred to a survey point.

10. The method of claim 9 wherein in step (a) incoming calls are selected partly on a percentage basis.

11. The method of claim 9 wherein step (c) is conducted automatically by Interactive Voice Response System (IVR).

* * * * *